(No Model.)
2 Sheets—Sheet 1.

A. F. RINEHART.
CULTIVATOR.

No. 467,382.  Patented Jan. 19, 1892.

WITNESSES:  
Chas. Nida  
C. Sedgwick

INVENTOR:  
A. F. Rinehart  
BY  
Munn & Co.  
ATTORNEYS (No Model.) 2 Sheets—Sheet 2.
A. F. RINEHART.
CULTIVATOR.
No. 467,382. Patented Jan. 19, 1892.
Fig. 3.
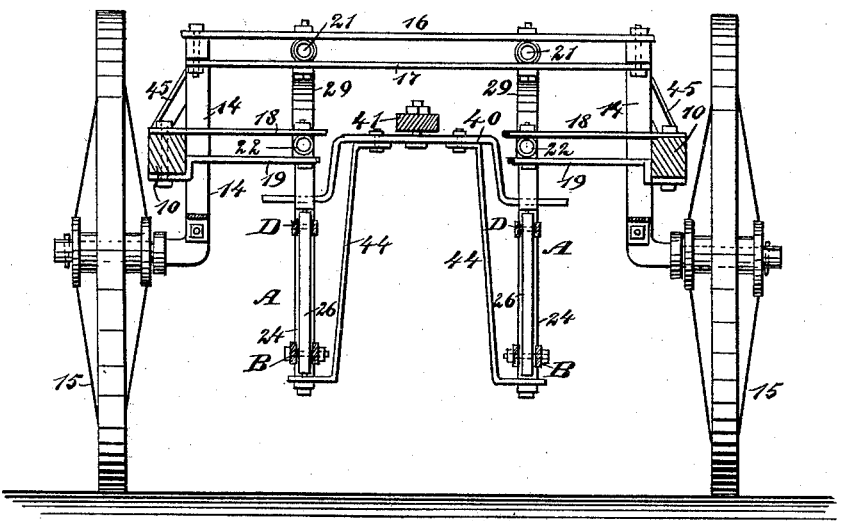
Fig. 6.
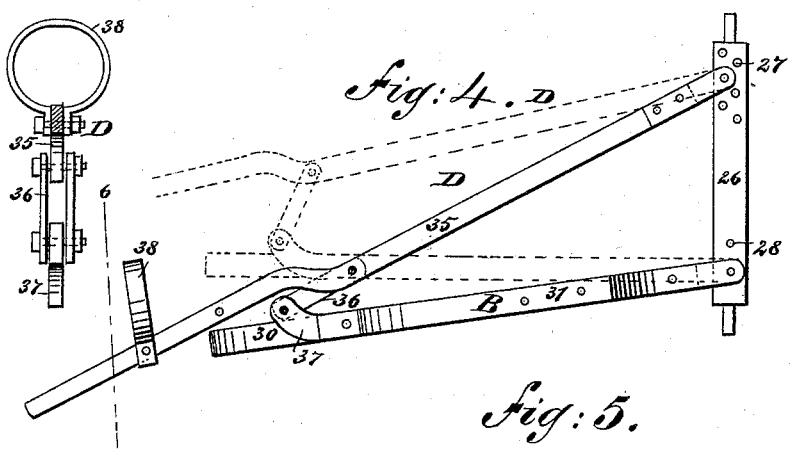
Fig. 4.
Fig. 5.
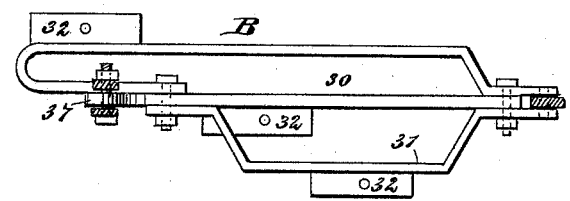
WITNESSES:
Chas. Nida.
C. Sedgwick.
INVENTOR:
A. F. Rinehart
BY Munn & Co.
ATTORNEYS

UNITED STATES PATENT OFFICE.

ADAM F. RINEHART, OF NEAR UNIOPOLIS, OHIO.

CULTIVATOR.

SPECIFICATION forming part of Letters Patent No. 467,382, dated January 19, 1892.

Application filed July 14, 1891. Serial No. 399,513. (No model.)

*To all whom it may concern:*

Be it known that I, ADAM F. RINEHART, of near Uniopolis, in the county of Auglaize and State of Ohio, have invented a new and useful Improvement in Cultivators, of which the following is a full, clear, and exact description.

My invention relates to an improvement in cultivators, and has for its object to provide an implement of simple, durable, and economic construction and of light draft, capable of being conveniently manipulated and of plowing to a uniform depth.

A further object of the invention is to provide a means whereby the cultivator teeth or blades will be under the complete control of the driver and whereby the teeth may be adjusted both vertically and laterally, as occasion may demand.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
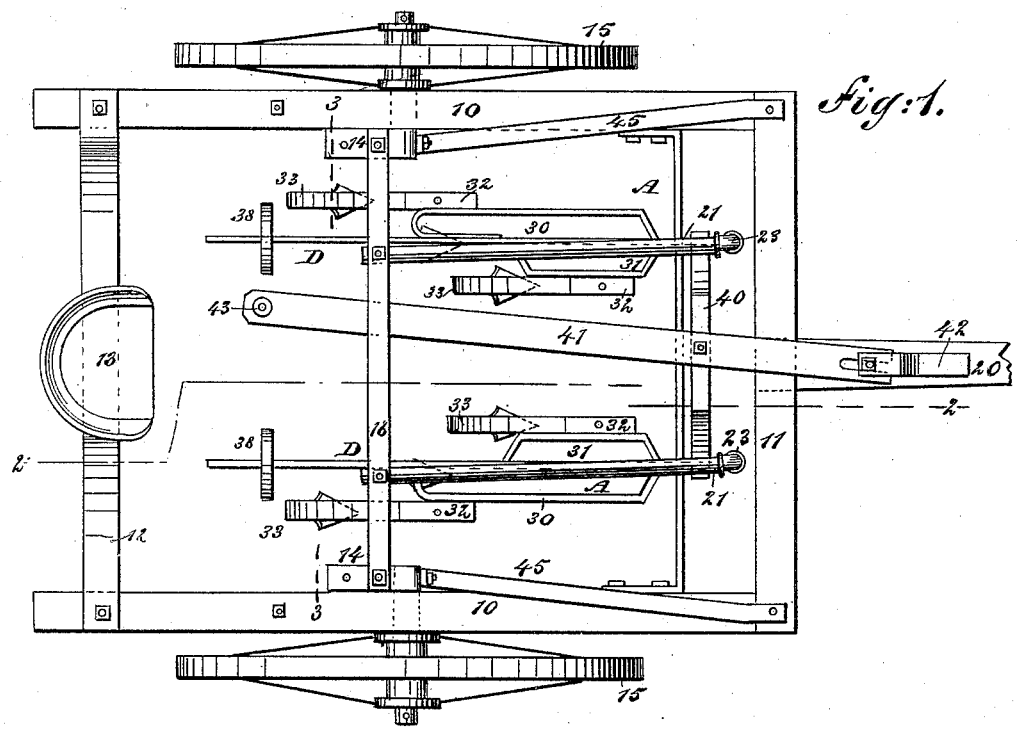
Figure 2:
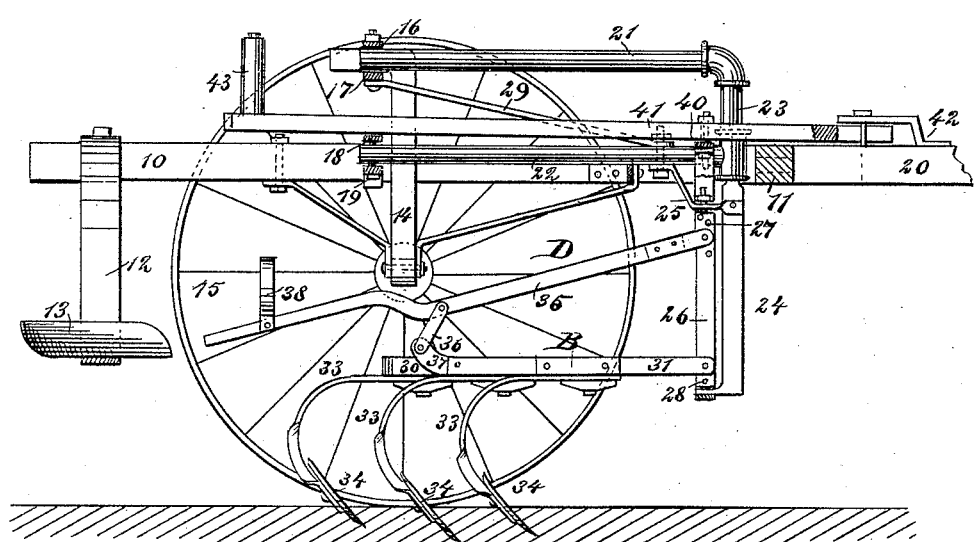

Figure 1 is a plan view of the implement. Fig. 2 is a longitudinal section taken practically on the line 2 2 of Fig. 1. Fig. 3 is a transverse section taken practically on the line 3 3 of Fig. 1. Fig. 4 is a detail view of the levers for manipulating the cultivator-teeth. Fig. 5 is a detail view of the beam to which the cultivator teeth or blades are attached, and Fig. 6 is a sectional end view of the same on the line 6 6 in Fig. 5.

The main frame of the implement consists, preferably, of two side beams 10, united at the front by a cross-beam 11 and at the back by a strap 12 or the equivalent thereof, upon which strap the driver's seat 13 is secured. The axles 14 are independent and are preferably made essentially L-shaped, as best shown in Fig. 3, the said axles being secured to the side beams 10 of the main frame and extending above and below said beams, the supporting-wheels 15 of the implement being loosely mounted upon the horizontal members of the axles. The axles at their upper ends, however, are preferably connected through the medium of two spaced parallel bars 16 and 17, and beneath the said bars two corresponding bars 18 and 19 are secured transversely to the side beams of the main frame. The main frame is provided with a tongue or pole 20, to which the draft is applied.

In connection with the main frame I employ two swinging frames A, the said swinging frames being adapted to carry the cultivator-teeth and are themselves carried by the main frame. As both of the swinging frames are identical and are arranged side by side, I will describe in detail one frame only. Each swinging frame consists, preferably, of two horizontal spaced bars or beams 21 and 22, which are secured to or made integral with a vertical bar or beam 23, the said vertical bar or beam constituting the front portion of the frame.

In the construction of the swinging frame the vertical bar or beam 23 and the horizontal beams or bars 21 and 22 are preferably made of pipe of suitable diameter, connected by appropriate fittings. In the vertical bar or beam 23 an essentially-L-shaped bracket 24 is firmly attached. This bracket usually consists of a metal bar rectangular in cross-section, and its horizontal member is at the lower end and constitutes the foot of the frame. The bracket 24 is connected with the lower horizontal beam or bar 22 by an angled brace 25, and a turn-table 26 is pivoted in the shoe of the bracket 24 and in the angled brace 25, the said turn-table preferably consisting of a flat bar of metal provided with trunnions at its ends, the upper trunnion, which passes through the brace-bar 25, being provided with a nut. The turn-table is also provided at its upper end with a series of apertures 27 and at its lower end with apertures 28.

The parallel horizontal bars or beams 21 and 22 of the frame are connected and strengthened usually by a diagonal brace 29, and the cultivator-beam B is pivoted to the lower end of the turn-table, while an adjusting-lever D, whereby the cultivator blades or teeth are manipulated, is fulcrumed at the upper end of the turn-table. The cultivator-beam B is illustrated in Fig. 5 and is of peculiar construction. It consists, preferably, of metal bars bent to form two links 30 and 31, one link being longer than the other, and the links are arranged side by side, the links being flush with the forward end of the beam.

Three or more blocks 32 are secured to the links in a manner to impart to them a stepped arrangement, and to these blocks 32 the shanks 33 of the cultivator blades or teeth 34 are secured in any approved manner. The cultivator teeth or blades and shanks may be of any approved pattern.

With reference to the adjusting-lever used in connection with the beam B, the said lever, as illustrated in detail in Fig. 4, consists of a main or body bar 35, which is pivoted at one end to the upper apertured portion of the turn-table 26. Near the lower end of the lever its body-bar is curved, and at the curved portion of the body-bar a link 36 is pivoted, which link is also pivotally attached to an arm 37, extending upward from the rear portion of the cultivator-beam. The lever may be operated by hand, if so desired, as it is convenient to the driver's seat, and it may also be operated by the foot of the driver, as it has attached thereto a loop or stirrup 38, into which the foot is passed.

The swinging frames A are attached to the main frame by causing the rear ends of the horizontal bars or beams 21 and 22 to pass between the two sets of cross-bars 16 and 17 and 18 and 19, between which cross-bars they are pivoted, the swinging frames being thus attached to the main frame at no other point than their rear ends, and therefore it is obvious that they may be readily moved laterally at their forward ends. In order that both frames may be moved together and in the same direction, they are connected by a yoke 40. The ends of the yoke being preferably attached to the braces 25, the swinging frames are given a lateral movement either to the right through the medium of a lever 41, which is attached at one side of its center to the yoke 40 of the swinging frames, and the forward end of the lever is pivoted upon the tongue or pole 20, the pivotal connection being usually effected by producing a slot in the lever, as shown in Fig. 1, passing an angled strap or plate 42 over the slotted end of the lever attached to the tongue or pole, and passing a pin through the strap and through the slotted portion of the lever. The rear end of the lever is convenient to the driver's seat and is preferably provided with a hand-pin 43 or the equivalent thereof.

Thus in the operation of the implement the cultivator blades or teeth may be carried either to the right or to the left, as the operator may desire, by manipulating the lever 41, and the teeth may be raised or lowered to plow deep or shallow by manipulating the levers D. When the levers are pressed downward, as illustrated in positive lines in Fig. 4, the cultivator teeth or blades are forced to their greatest depth into the ground, and the links, assuming a position at an angle to both the lever and the beam B, effectually lock the teeth in their lowermost position. The teeth are removed entirely or partially from the ground by lifting up the lever D, at which time it will assume the position shown in dotted lines, Fig. 4.

In order to strengthen the swinging frames, I preferably connect the foot of each frame and the yoke 40 by brace-bars 44, and the yoke 40 is ordinarily provided with a series of apertures whereby the two swinging frames may be connected in a manner to bring them close together or far apart, as the character of the work may demand. I also preferably brace the main frame by brackets 45, secured to the axles and to the beams of the main frame, as is best shown in Fig. 1.

The strap 12, supporting the driver's seat, is usually dropped at the center a sufficient distance to bring the lever 41 within convenient reach of the driver's hands and the levers D within reach of his feet.

It will be observed from the foregoing construction that through the medium of the levers D the beams carrying the cultivator teeth or blades may be swung to the right or to the left independently of the swinging frame proper, as well as being capable of vertical adjustment.

Having thus described my invention, I claim as new and desire to secure by Letters Patent—

1. In a cultivator, the combination, with the main frame, of a swinging frame having a pivotal connection at its rear end with the main frame, a lever connected with the swinging frame, imparting thereto a lateral movement of the front portion of the latter, and a blade or tooth beam having pivotal connection with the swinging frame and a connection with the said beam, as and for the purpose specified.

2. In a cultivator, the combination, with the main frame thereof, of a swinging frame having at its rear end a pivotal connection with the main frame, a turn-table pivoted in the swinging frame, a tooth or blade beam pivoted to the turn-table, and a lift-lever also pivoted to the turn-table and connected with the said beam, as and for the purpose specified.

3. In a cultivator, the combination, with a main frame and a swinging frame having a pivotal connection with the main frame, of a turn-table pivoted in the swinging frame, a cultivator tooth or blade beam adjustably connected to the lower end of the turn-table, a lift-lever adjustably connected to the upper end of the turn-table and connected, also, with the said beam, and an adjusting-lever fulcrumed upon the main frame and connected with the swinging frame, whereby the latter is given a lateral movement, as and for the purpose specified.

4. In a cultivator, the combination, with a fixed frame and swinging frames pivotally connected to the fixed frame and a yoke connecting said swinging frames, of a turn-table pivotally located in each swinging frame, a cultivator tooth or blade beam adjustably attached to the lower end of each turn-table, a lift-lever adjustably connected to the upper end of each turn-table and having a link connection with the beam below it, and an adjusting-lever fulcrumed upon the main frame and attached to the yoke, as and for the purpose specified, whereby the two swinging frames may be moved laterally in unison and the beams carrying the cultivator teeth or blades be adjusted vertically or laterally independently of the swinging frames, as and for the purpose specified.

ADAM F. RINEHART.

Witnesses:
 HENRY TAYLOR,
 B. F. HARTUNG.